(12) United States Patent
Shishikura

(10) Patent No.: US 7,237,344 B2
(45) Date of Patent: Jul. 3, 2007

(54) JIG FOR POSITIONING VEHICULAR PART

(75) Inventor: Yasuyuki Shishikura, Niiza (JP)

(73) Assignee: Honda Access Corp., Niiza-shi (JP)

( * ) Notice: Subject to any disclaimer, the term of this patent is extended or adjusted under 35 U.S.C. 154(b) by 0 days.

(21) Appl. No.: 11/317,254

(22) Filed: Dec. 27, 2005

(65) Prior Publication Data

US 2006/0143892 A1 Jul. 6, 2006

(30) Foreign Application Priority Data

Dec. 28, 2004 (JP) ............................ 2004-379757
Mar. 31, 2005 (JP) ............................ 2005-102034

(51) Int. Cl.
*G01B 5/25* (2006.01)
(52) U.S. Cl. ......................................... 33/645; 33/600
(58) Field of Classification Search ................ 33/1 BB, 33/562, 563, 600, 613, 645
See application file for complete search history.

(56) References Cited

U.S. PATENT DOCUMENTS

| | | | | |
|---|---|---|---|---|
| 4,291,467 A | * | 9/1981 | Shultz, Jr. ..................... | 33/600 |
| 4,606,129 A | * | 8/1986 | Barrowman et al. .......... | 33/613 |
| 4,610,096 A | * | 9/1986 | Sahler et al. .................. | 33/562 |
| 4,876,786 A |   | 10/1989 | Yamamoto et al. | |
| 4,969,273 A | * | 11/1990 | Richards ....................... | 33/613 |
| 5,491,905 A | * | 2/1996 | Jablonski et al. ............. | 33/613 |
| 5,551,162 A | * | 9/1996 | Struble ......................... | 33/613 |
| 5,822,942 A | * | 10/1998 | Lucia, Jr. ...................... | 33/645 |
| 7,040,151 B2 | * | 5/2006 | Graham et al. ............... | 33/600 |
| 2004/0031165 A1 | * | 2/2004 | Stephens ...................... | 33/562 |
| 2005/0257389 A1 | * | 11/2005 | Pierson et al. ................ | 33/562 |

FOREIGN PATENT DOCUMENTS

| | | |
|---|---|---|
| JP | 59-114173 | 7/1984 |
| JP | 60-127293 | 8/1985 |
| JP | 2001-300870 | 10/2001 |

OTHER PUBLICATIONS

UK Search Report, dated Apr. 28, 2006 of GB0526496.5.

* cited by examiner

*Primary Examiner*—G. Bradley Bennett
(74) *Attorney, Agent, or Firm*—Westerman, Hattori, Daniels & Adrian, LLP.

(57) ABSTRACT

A jig for positioning vehicular exterior parts, which can improve workability as well as accuracy of a mounting location. A jig 1 used when aching exterior parts to a vehicle 20 includes a first engagement portion 4 prescribing a location in a height direction of the vehicle 20, and a second engagement portion 5 prescribing a location in a direction orthogonal to the height direction of the vehicle 20. At least one of the first engagement portion 4 and the second engagement portions 5 is fixed between a vehicle body 22 and a door 21. The jig 1 is formed from a tabular member. As a result, positioning in mutually orthogonal two directions can be carried out simultaneously, simplifying attachment works.

14 Claims, 10 Drawing Sheets

JIG FOR POSITIONING VEHICULAR PART

BACKGROUND OF INVENTION

1. Field of the Invention

The present invention relates to a jig for positioning vehicular exterior parts, used at the time of attachment of exterior parts, such as a side under spoiler or the like.

2. Description of Related Arts

In order to attach exterior parts to a vehicle, it has heretofore been necessary to measure a distance from a reference position such as an edge of a vehicle body or door, using a tape measure to determine where the exterior parts are to be attached, and thus such attachment work has been somewhat troublesome in the past.

As a means for solving the above-mentioned problem, Japanese Unexamined utility model publication No. 60-127293, for example, proposes a jig for attaching a side protector molding for vehicle, said jig being fitted into a space between doors or a door and a fender in order to position the side protector molding in a longitudinal direction, prior to attaching the side protector molding to the door or fender of the vehicle, and comprising: an elastic two-forked leg that is capable of being inserted into the space and engaged therein; and a head having an abutting section for allowing the longitudinal end of the side protector molding to about thereto when the leg is inserted into the space, said head protrudes by a predetermined thickness "T" from the width of the aforementioned space at least on the side adjacent to the rotational center of the door.

According to this conventional jig for attaching the side, protector molding, the elastic leg is inserted into the space to allow the same to abut to the door or fender, and then the longitudinal end of the side protector molding attached to the fender is allowed to about to the head, whereby not only the positioning work can be easily performed but also the dimensional error of the space can be absorbed due to the leg having elasticity, so that it excels in workability. Further, in FIG. 14 showing another prior art, there is illustrated a jig 53 used for attaching a side under spoiler, in which the positioning is carried out with the jig being about to a vehicle body 52 with a door 51 being opened.

According to the conventional jig for attaching the side protector molding disclosed in Japanese Unexamined utility model publication No. 60-127293, however, it is only possible to carry out the positioning in the longitudinal direction, and not possible to carry out the positioning in the height direction simultaneously therewith, and thus there was a problem that reduction of the number of man-hours was difficult. On the other hand, the conventional jig 53 shown in FIG. 14 also has problems that the door 51 needs to be opened fully at the time of the positioning, and thus a large work space is required; and that since the worker needs to attach exterior parts with the jig 53 being held in place, not only the attachment work is complicated, but also the improvement of the accuracy of an attachment position was difficult. In addition, since the jig 53 is rotated during its use in accordance with where the positioning is carried out, the worker needs to follow instructions of an operation manual and the number of man-hours is increased, causing a concern that the worker might fail to follow the instructions properly.

SUMMARY OF THE INVENTION

In view of the above-mentioned problems, it is, therefore, an object of the present invention to provide a jig for positioning vehicular part that can not only improve workability but also improve the accuracy of the attachment position.

In order to attain the above-mentioned object, a jig for positioning vehicular part of the present invention employs the following means:

According to a first aspect of the invention, there is provided a jig for positioning vehicular part, used when attaching the vehicular part to a vehicle, including: a first engagement portion prescribing a location in a height direction (vertical direction) of the vehicle; and a second engagement portion prescribing a location in a direction substantially orthogonal to the height direction.

According to the first aspect of the present invention, the jig for positioning the vehicular part comprises the first engagement portion which prescribes the location in the height (pitch) direction of the vehicle and the second engagement portion which prescribes the location in the direction substantially orthogonal to the height direction of the vehicle, whereby it is possible to carry out the positioning in mutually orthogonal two directions simultaneously, thus simplifying the positioning works, reducing the number of man-hours while improving the dimensional accuracy in the attachment position since the measurement with a tape measure or marking with a pen is no longer necessary.

A second aspect of the invention is a jig for positioning vehicular part according to the fist aspect, wherein at least one of said first engagement portion and said second engagement portion is fixed between a vehicle body and an openable and closable body.

According to the second aspect of the present invention, the first engagement portion and the second engagement portion are fixed between the vehicle body and the openable and closable body (i.e., door), and thus the jigs can remain fixed to the vehicle, thus eliminating the need of skills at the time of attachment works, improving the workability as well as the accuracy in mounting location.

A third aspect of the invention is a jig for positioning vehicular part according to the first or second aspect, wherein the jig is formed by folding a tabular member.

According to the third aspect of the present invention, the jig can be formed by folding a tabular member, such as a paper pattern, a plastic board or the like, and thus a manufacturing cost can be reduced. Further, since it can be transported in a tabular form, a transportation cost can also be reduced. Furthermore, since the jig can be formed by cutting a tabular member and folding it up suitably, no special technique is required to form the jigs when installing the vehicle parts.

A fourth aspect of the invention is a jig for positioning vehicular part according to one of the foregoing aspects 1 to 3, further comprising a base, the base including said first and second engagement portions, wherein said base further includes an extension section provided with a reference line for indicating a reference mounting location of the vehicular exterior parts.

According to the fourth aspect of the present invention, the reference line can be extended to the mounting location of the vehicular exterior parts, and thus it is possible to improve the accuracy of the mounting location without the need of skills.

A fifth aspect of the invention is a jig for positioning vehicular part according to one of the foregoing aspects 1 to 4, wherein at least one of the first and second engagement portions includes a hold section for holding the openable and closable body in a sandwiched manner.

According to the fifth aspect of the present invention, the jig can be held in the openable and closable body owing to the provision of the hold section, thus enabling the workability to be improved. Further, since the jig is prevented from being moved unexpectedly in opening or closing the door, positioning accuracy can be improved and the number of man-hours can be reduced.

A sixth aspect of the invention is a jig for positioning vehicular part according to the fifth aspect, wherein the hold section comprises an inlet section and a bottom section, the inlet section being formed narrower than the bottom section.

According to the sixth aspect of the present invention, due to the inlet section being formed narrower than the bottom section, the door can be held reliably, and it is possible to disperse and absorb, in the bottom section, the stresses that act on the hold section. Accordingly, the hold section can withstand repeated use.

BRIEF DESCRIPTION OF THE DRAWINGS

The invention will be more readily understood by reference to the following description, taken with the accompanying drawings, in which:

FIG. 10(A) is a partial development view of a jig for attaching exterior parts to a vehicle in accordance with a second embodiment of the invention, while FIG. 10(B) is a partially enlarged view thereof.

FIGS. 12(A) and 12(B) are longitudinal sections of a positioning mechanism of the invention, in which FIG. 12(A) shows the jig in a temporarily retained state, while FIG. 12(B) shows the jig with the door being shut.

FIGS. 13(A) and 13(B) are also longitudinal sections of the positioning mechanism of the invention, in which FIG. 13(A) shows the main body of that mechanism with the door being displaced downward relative to the main body of the positioning mechanism, while FIG. 13(B) shows the mechanism with the door being shut.

DETAILED DESCRIPTION OF THE INVENTION

Figure 1:
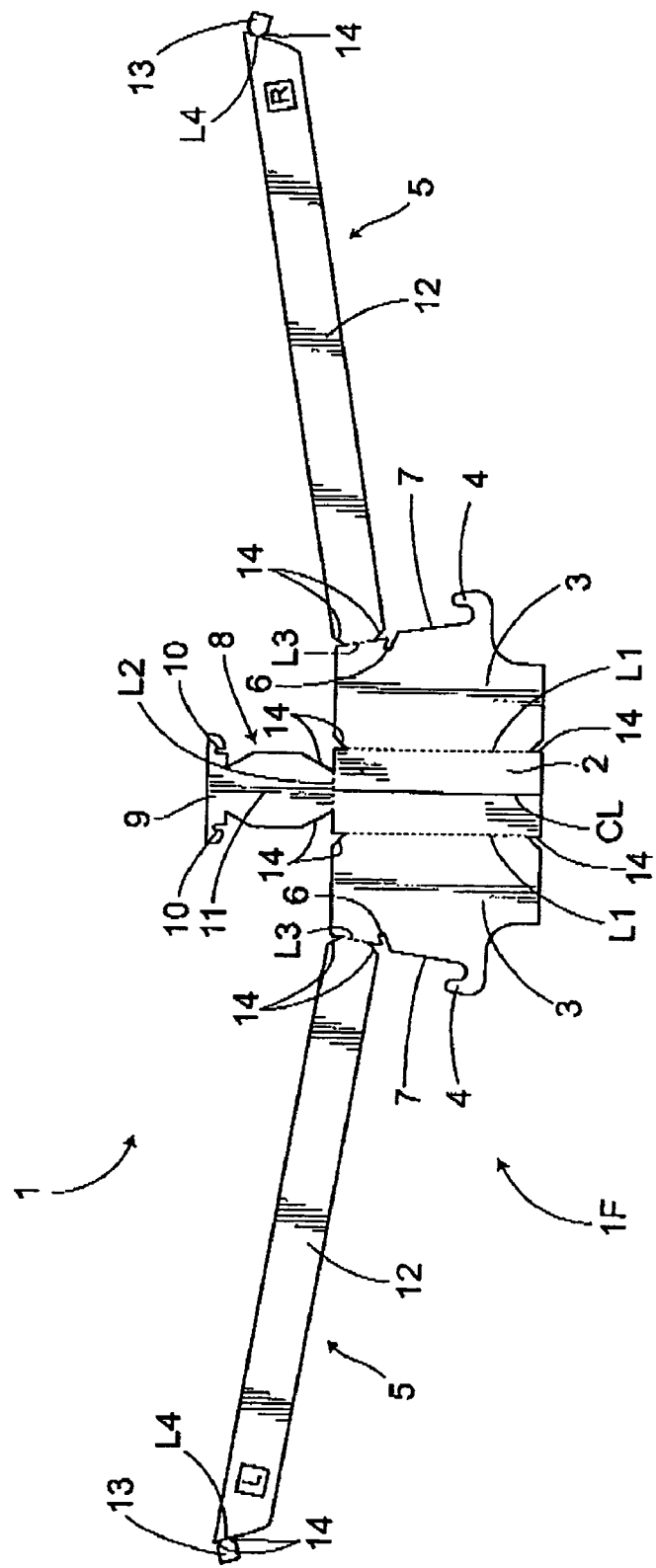
FIG. 1 is a development view of a jig for attaching exterior parts to a vehicle in accordance with a first embodiment of the invention.
Figure 2:
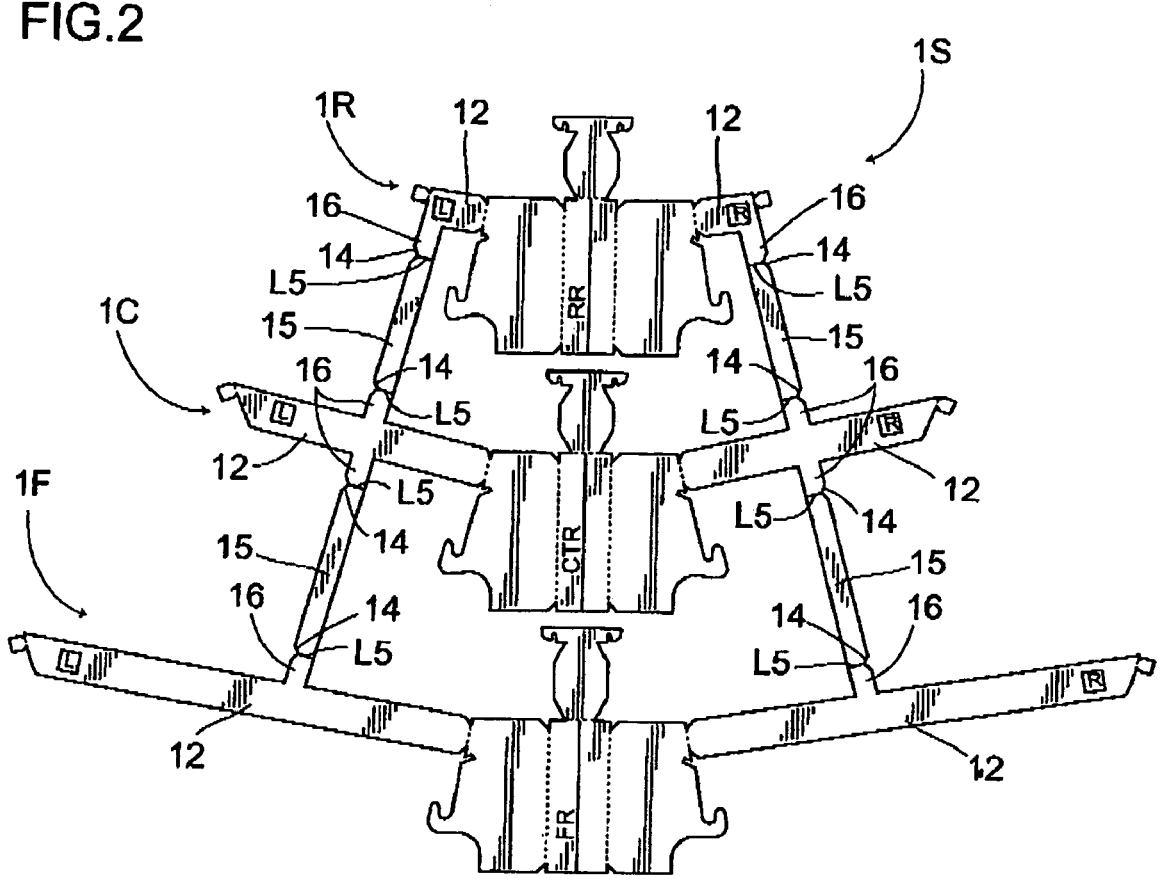
FIG. 2 is a development view of a jig set of the fast embodiment of the invention.
Figure 3:
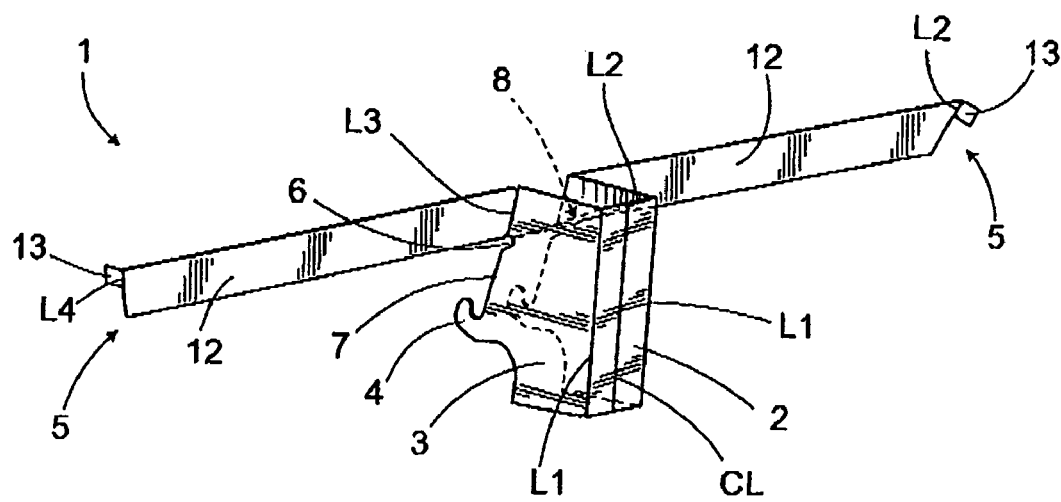
FIG. 3 is a perspective view of the jig of the first embodiment.

Next is a description of a first embodiment of the jig for positioning vehicular part according to the present invention with reference to FIGS. 1 to 3.

FIG. 1 is a development of the jig 1 for positioning vehicular part (hereinafter simply called "jig 1") of the invention. The jig 1 is composed of a tabular material such as a paper pattern, pasteboard or the like. The jig 1 comprises a base 2 arranged in the center, a side portion 3 arranged at the sides of the base 2, a first engagement portion 4 provided at the side portion 3 and a second engagement portion 5 extending in the horizontal direction in a manner like a wing, provided symmetrically with respect to the base 2. A return line L1 is provided in a connecting portion between the base 2 and the side portion 2.

The side face section 3 comprises the aforesaid first engagement portion 4 formed in a lower portion thereof and a slanted groove 6 provided substantially in the center thereof, while the first engagement portion 4 and the slanted groove 6 being connected to each other by a side edge portion 7. The first engagement portion 4 is formed in a hook shape which is open on a top side. The slanted groove 6 is open to the outside, formed to be inclined downward.

A space retaining section 8 is formed in an upper end of the base 2. This space retaining section 8 is composed of a letter-T-shaped member, including a sidewise extension member 9 extending in the longitudinal direction and a vertical groove 10 that is opened downward, formed in an extension line of the aforesaid first return line L1. A lengthwise extension member 11 extending in a height direction has approximately the same width as the base 2. A reference line CL is provided in the height direction, substantially in the center of the base 2. A second return line L2 is provided in a connecting portion between the base 2 and the space retaining section 8.

The second engagement portion 5 comprises an extension section 12 prolonged from the side face section 3, and an engagement piece 13 provided at the tip of the extension section 12. The extension section 12 is connected to an upper portion of the side face section 3 through the 3rd return line L3. An indication of L showing the direction of left is provided in the left extension section 12, while that of R showing the direction of right in the right extension section 12, respectively. The engagement piece 13 is connected to the tip of the extension 12 through the fourth return line L4. A V-shaped groove 14 is provided in both ends of each of the aforesaid return lines L1-L4.

FIG. 2 is a development of a jig set 1S consisting of three jigs 1F, 1C and 1R of different sizes, arranged in the longitudinal direction, in which the extension sections 12 are coupled by a joint member 15, while the joint member 15 is connected with the extension section 12 through a cutting plane line L5. The jigs 1F, 1C and 1R are each marked with letters FR, CTR and RR which mean that the jigs are for use in front, center and rear, respectively. At least one end of the cutting plane line L5 is formed with a V-shaped groove 14. In the meantime, the extension section 12 is provided with a protrusion 16 provided in a connecting portion between the same and the joint member 15.

The return lines L1-L4 and the cutting plane line L5 may be formed in a perforation line or a press fold line, in order to make folding or cutoff works easy. Further, the return lines L1-L4 may be labeled with an indication that means either a mountain fold or a valley fold. Since each jig 1F, 1C, and 1R which constitute the jig set 1S has the same structure as the jig 1 of FIG. 1, and thus a detailed description of the structure of each jig is omitted herein for the sake of simplicity.

The jig set 1S constituted thus way is divided into each jig 1F, 1C and 1R by separating the joint member 15 along the cutting plane line L5. Due to the V-shaped groove 14 being formed in the cutting plane line L5, such cutoff works can be easily performed without using cutting tools such as scissors or a cutter. Further, due to the protrusion 16 being provided in the extension section 12, it is possible to prevent the extension section 12 from being cut off by mistake.

Next is a description of how the jig 1 is assembled with reference to FIG. 3. In the jig 1, the side face section 3 is folded convexly (i.e., mountain fold) at the First return line L1 with the base 2 being held in place. When the side face section 3 is folded convexly at the first return line L1, then the side face sections 3 are arranged opposite to each other in parallel. Then, the space retaining section is folded convexly at the second return line L2, so that the aforesaid vertical groove 10 is allowed to engage with the slanted groove 6.

When the vertical groove 10 is allowed to engage with the slanted groove 6, the space retaining section 8 holds the side face section 3 at a fixed interval. Namely, due to the vertical groove 10 being formed on a extension line of the first return line L1 as well as the space retaining section 8 having approximately the same width as the base 2, the side face section 3 is retained at right angles to the base 2, while the vertical groove 10 is allowed to engage with the slanted groove 6, thereby preventing the side face section 3 from being deformed by the spring back. Moreover, due to the slanted groove 6 being formed substantially in the center of the side face section 3, the space retaining section 8 is slanted from the upper end of the base 2 to thereby be retained in the center of the side face section 3.

Subsequently, the extension section 12 is folded concavely (i.e., valley fold) in the third return line L3 so as to be formed at right angles to the side face section 3, aid thus the right and left extension sections 12 are allowed to extend in the horizontal direction in a manner like a wing. At that moment, the side edge 7 which connects the slanted groove 6 with the first engagement portion 4 is substantially aligned with the third return line L3 in which the extension section 12 is folded concavely. Further, the engagement piece 13 is folded convexly in the fourth return line L4, so that it is formed at right angles to the extension section 12.

As mentioned above, since the jig 1 is formed by folding a tabular member, manufacturing cost ran be reduced. Besides, since the three kinds of jigs can be transported as the jig set 1S that is in a tabular state, transportation cost as well as the number of components can be reduced. Further, since no tools are necessary to assemble the same, the number of man-hours can be diminished. Furthermore, due to the V-shaped groove 14 provided at respective both ends of the return lines L1-L4, stress is allowed to concentrate on the return lines L1-L4 when carrying out the mountain fold or valley fold in the return lines L1-L4, thus facilitating the folding in the respective return lines, eventually resulting in easy assembling of the jig.

Figure 4:
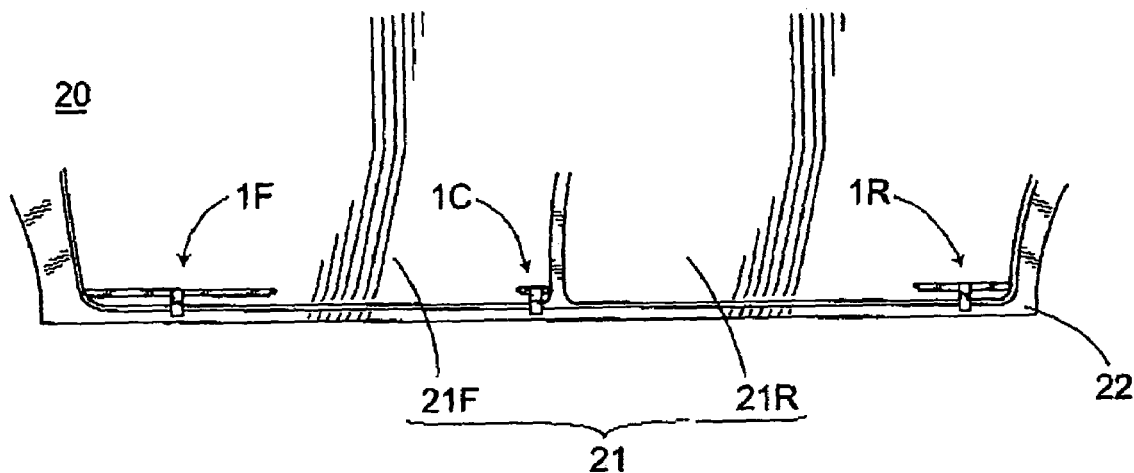
FIG. 4 is a side view thereof, showing the jig is in actual use.

The jig 1 formed thus way is installed below the door 21 that is an openable and closable body at the side of the vehicle 20, as shown in FIG. 4. For the jig 1, three kinds of the jigs of different sizes, i.e., the front jig 1F, the center jig 1C and the rear jig 1R arc prepared, corresponding to where they are installed, and installed in the front part of the front door 21F, the rear part of the front door 21F, and the rear part of the rear door 21R, respectively.

Next, is a description of the jig 1 with reference to FIGS. 5 to 8. In the following description, the direction substantially orthogonal to the height direction of tie vehicle 20 is assumed to be the traveling direction of the vehicle 20. For the simplicity, the description is made of a door that is located on a left hand with respect to the traveling direction.

Figure 5:
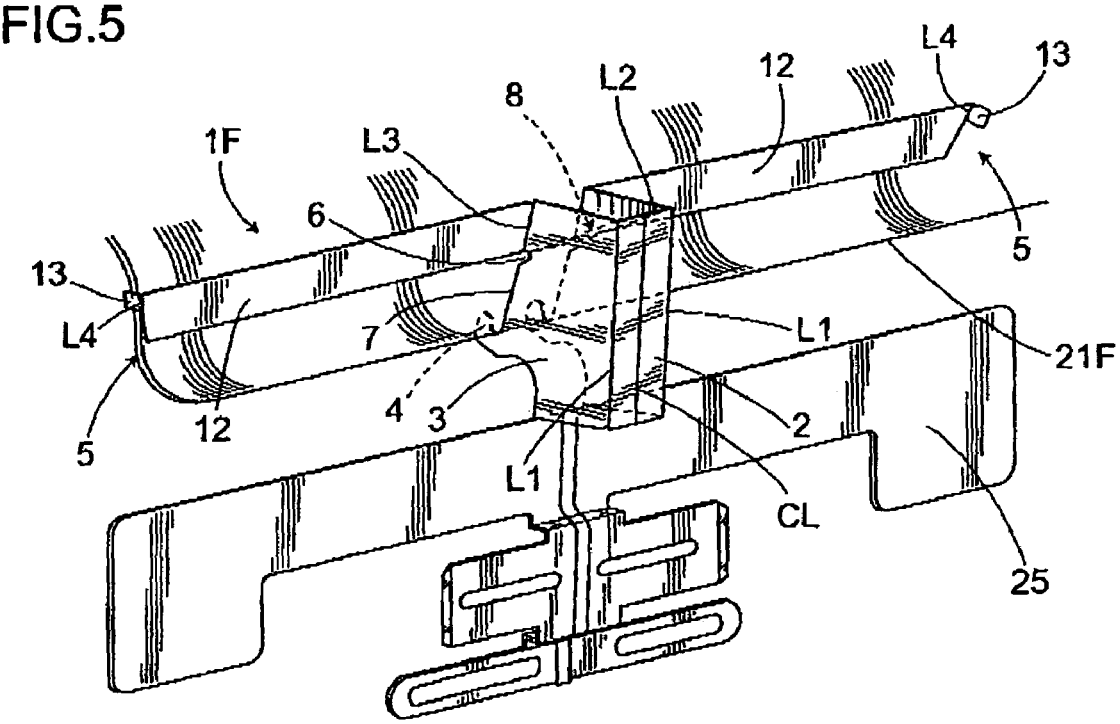
FIG. 5 is a perspective view showing a front jig in actual use, in accordance with the first embodiment of the invention.
Figure 6:
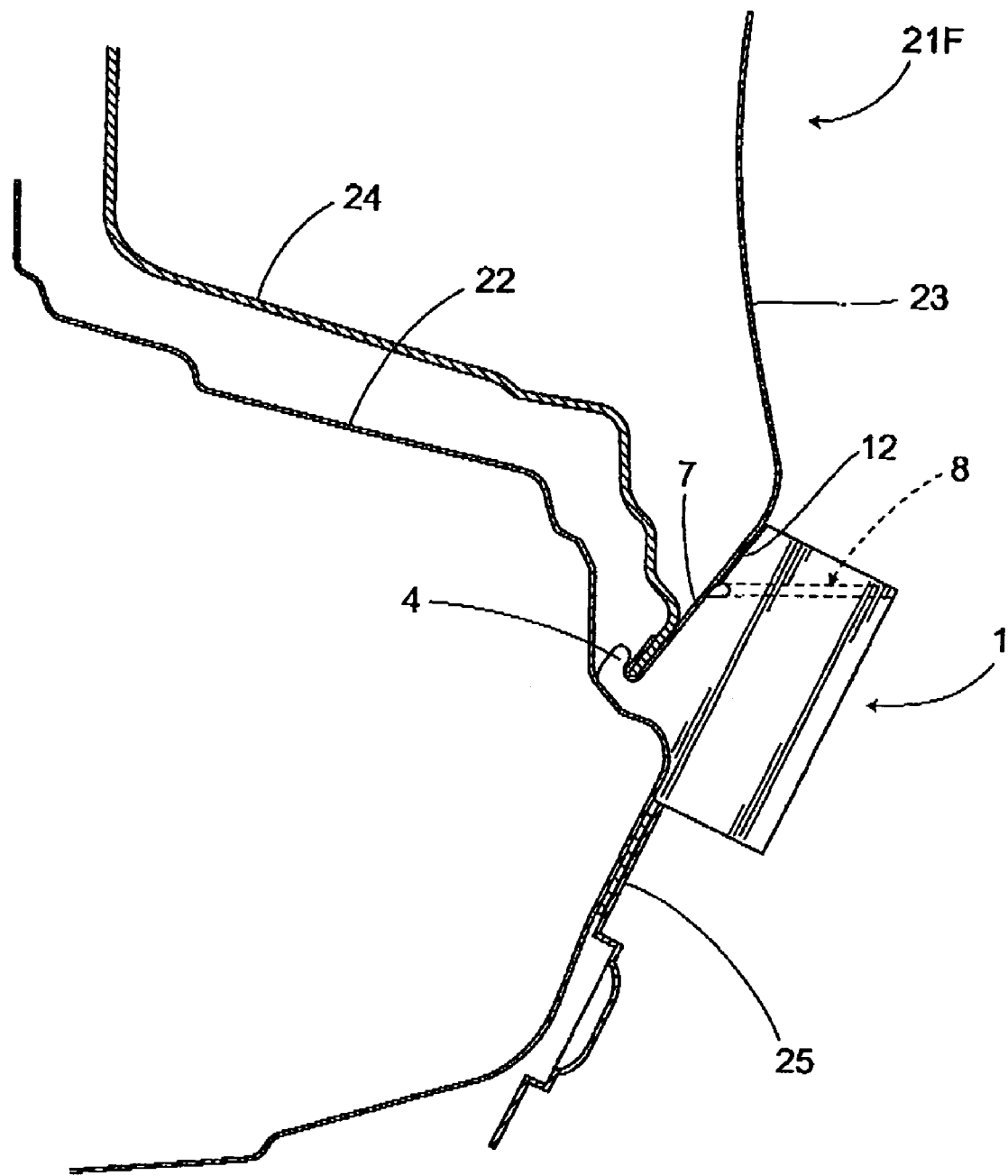
FIG. 6 is a longitudinal section thereof, which is also in actual use.

First, the installation method of the front jig 1F is explained. As shown in FIG. 5, the first engagement portion 4 is fixed between the front door 21F and the vehicle body 22 of the vehicle 20. That is, the front door 21F is opened and then the first engagement portion 4 is engaged with the lower end of the front door 21F. The front door 21F is shut with such state being kept. This, the front jig 1F is fixed between the front door 21F and the vehicle body 22, with the side face sections 3 being about to the front door 21F vertically. Since the first engagement portion 4 has a profile corresponding to a clearance between the front door 21F and the vehicle body 22, as shown in FIG. 6, it is allowed to come into close contact with the vehicle body 22. Namely, the front door 21F comprises an outer body 23 constituting a part of an outer structure of the vehicle 20 and an inner body 24 constituting a part of an inner structure thereof, said inner body 24 having a thickness larger than the outer body 23, and formed integrally with the outer body 23 at its end by welding.

The first engagement portion 4 formed in a hook shape is engaged with the lower end of the front door 21F constituted this way. By forming the side end 7 according to the surface shape of the outer body 23, the side face section 3 is allowed to closely contact the outer body 23, so that the front jig 1F is brought into close contact with the front door 21F to thereby be engaged therein reliably. Further, the first engagement portion 4 is formed in a shape corresponding to the vehicle body 22 where it is about to the vehicle body 22. By forming the first engagement portion 4 according to the shapes of the lower end of the front door 21F and the vehicle body 22, it is possible to hold the front jig 1F in position relative to the front door 21R and the vehicle body 22 with the side face sections 3 being about to the front door 1F vertically, preventing the Jig 1F from being displaced in the up-and-down direction, thereby enabling the position in the height direction to be prescribed accurately. Subsequently, as shown in FIG. 5, the second engagement portion 5 is engaged with the front end of the front door 21F. That is, the font jig 1F that is fixed relative to the front door 21F and the vehicle body 22 in the first engagement portion 4, is hold in position in manner capable of moving in the horizontal direction, with the side end 7 about to the outer body 23 of the vehicle body 22 and the extension section 12 extending horizontally along the outer body 23. With the side face section 3 of the front jig 1F fixed thus way being grasped, the jig 1 is moved in the horizontal direction until the tip of the extension section 12 arrives at the front end of the front door 21F. At this time, due to the slanted groove 6 formed substantially in the center of the side race section 3, and the space retaining section 8 extended obliquely from the upper end of the base 2 in order for a space to be retained between the side face sections 3, the strength of the front jig 1F can be ensured, thus enabling the deformation of the front jig 1F to be prevented when the side face sections 3 are grasped from outside.

When the tip of the extension section 12 reaches the front end of the front door 21F, the engagement piece 13 is folded convexly (mountain fold) at the fourth return line L4 to thereby be engaged in the front door 21F. At this time, the fourth return line L4 is formed so as to be slanted in accordance with the front end shape of the front door 21F, while tie engagement piece 13 is arranged at right angles to the fourth return line L4. Thus, the surface of the engagement piece 13 is allowed to contact the end face of the door 21F, thus ensuring the engagement in the front end of the front door 21, whereby positioning works can be carried out easily and accurately. By engaging the second engagement portion 5 in the front end of the front door 21F, it is possible to prescribe a position in the traveling direction.

By installing the front jig 1F in the vehicle 20 as mentioned above, positioning can be carried out simply and easily. Moreover, since what is necessary is just to open the front door 21F when engaging the first engagement portion 4 in the front door 21F, positioning works as well as attachment works can be performed without the need of a large working space. Further, since the front jig 1F can be held in position relative to the vehicle 20, it is possible to improve workability so that the installation with sufficient accuracy is insured even if the installation is not performed by a skillful worker. Furthermore, since the front jig 1F is formed symmetrically, it is possible to carry out the positioning, following the same steps, using the same front jig 1F in the right-hand font door 21F as well.

Moreover, since positioning can be carried out simply by engaging the first engagement portion 4 with the lower end of the front door 21F and engaging the second engagement portion 5 with the front end of the front door 21F, how to use the jig is so simple and clear that the use of the jig can be properly guessed even without directions from a detailed operation manual, thus enabling the erroneous installation thereof to be prevented. Moreover, due to the slanted groove 6 being formed substantially in the center of the side face section 3 and the space retaining section 8 extending obliquely from the upper end of the base 2 between the side face sections 3, the strength of the front jig 1F can be ensued, thus enabling the deformation of the front jig 1F to be prevented when the side face sections 3 are grasped from outside.

Figure 7:
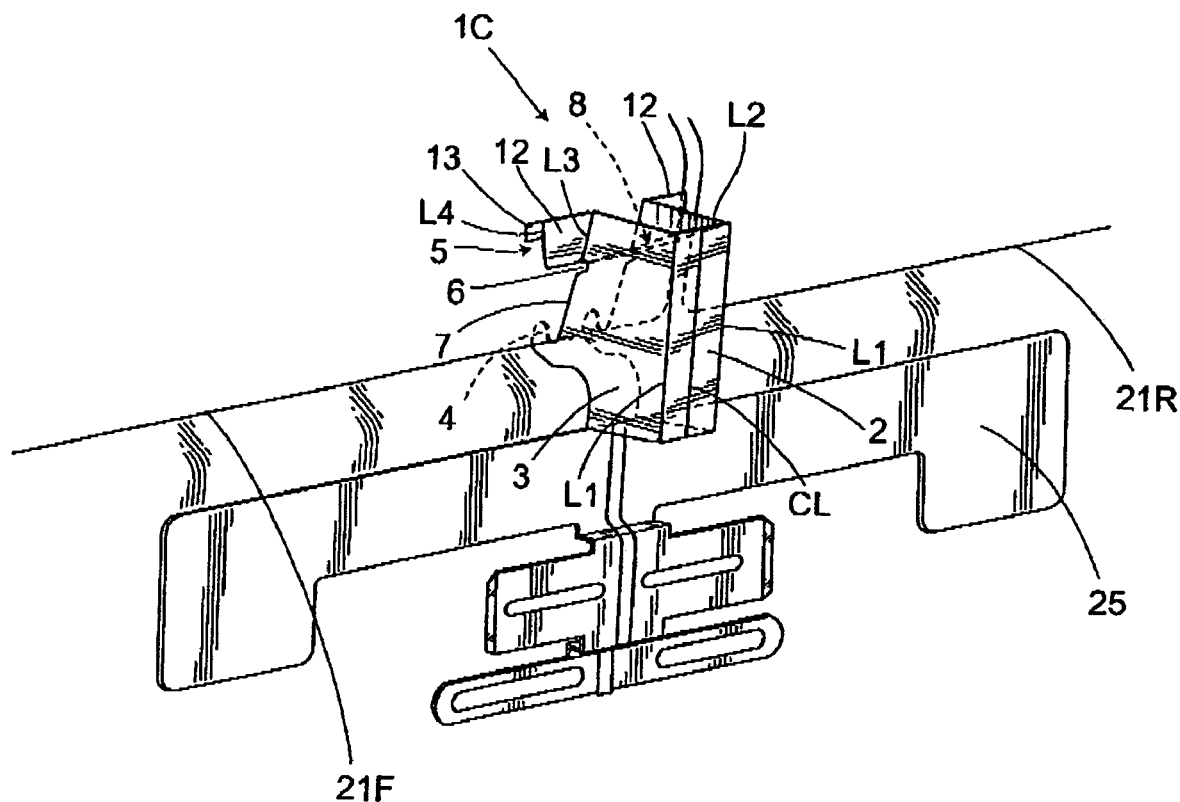
FIG. 7 is a perspective view of a center jig in actual use, in accordance with the first embodiment of the invention.

Next, the installation method of the center jig 1C is explained with reference to FIG. 7. The first engagement portion 4 is fixed between the front door 21F and the vehicle 20. Namely, the first engagement portion 4 is slid into a clearance between the front door 21F and the rear door 21R, so that the first engagement portion 4 is engaged with the lower end of the front door 21F. At this time, the first engagement portion 4 is Fixed, as in such a state as illustrated in FIG. 6, between the lower end of the front door 21F and the vehicle body 22. By engaging the first engagement portion 4 with the lower end of tee front door 21F in this way, it is possible to prescribe the position in the height direction accurately. Subsequently, the second engagement portion 5 is engaged with the back end of the front door 21F. That is, with the side face section 3 being held, the jig 1C is horizontally moved until the tip of the extension section 12 reaches the back end of the front door 21F. When the tip end of the extension section 12 reaches the back end of the front door 21F, the second engagement portion 5 is folded convexly (mountain fold) at the fourth return line L4, to thereby be engaged with the front door 21F. By engaging the second engagement portion 5 with the front end of the front door 21F this way, it is possible to prescribe the position in the traveling direction.

Figure 8:
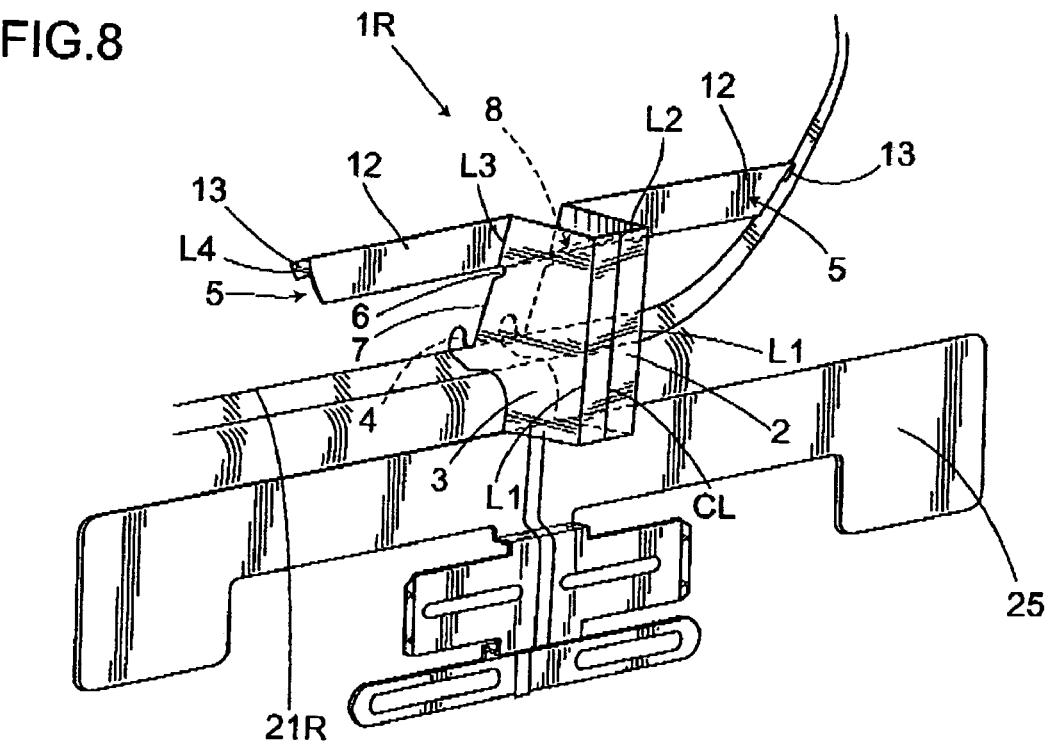
FIG. 8 is a perspective view of a rear jig in actual use, in accordance with the first embodiment of the invention.

Next is a description of how the rear Jig 1R is installed, with reference to FIG. 8. The first engagement portion 4 is fixed between the rear door 21R and the vehicle 20. That is, the rear door 21R is opened and the then the first engagement portion 4 is engaged with the lower end of the rear door 21R. The door is shut with such state being hold, so that the rear Jig 1R is fixed between the rear door 21R and the vehicle body 22. At this time, the first engagement portion 4 is fixed between the lower end of the rear door 21R, and the vehicle body 22, as shown in FIG. 6. By engaging the first engagement portion 4 with the lower end of the front door 21F thus way, it is possible to prescribe the location in the height direction accurately. Subsequently, the second engagement portion 5 is engaged with the back end of the rear door 21R. That is, with the side face section 3 being held, the Jig 1R is moved in the horizontal direction until the tip of the extension section 12 reaches the back end of the rear door 21R. When the tip of the extension section 12 reaches the back end of the rear door 21R, the second engagement portion 5 is folded convexly (mountain fold) at the return line L4 to thereby be engaged with the rear door 21R. By engaging the second engagement portion 5 with the back end of the rear door 21R thus way, it is possible to prescribe the location in the travailing direction.

Next, the action of respective structural parts is explained with reference to FIGS. 5, 6, and 8.

The jigs 1F, 1C and 1R are used to position the bracket 25 for attaching the exterior pats of the vehicle with reference to the door 21 serving as the openable and closable body of the vehicle 20.

The jigs 1F, 1C, and 1R installed in the vehicle 20 each prescribe the location in the height direction by the lower end of the base 2 projecting downward from the lower end of the door 21. The reference line CL provided in each base 2 prescribes the location in the traveling direction due to the fact that the same being located a certain distance away from the front end or back end of the door 21, said certain distance being a sum of the lengths of the extension section 12 and the base 2. Accordingly, the lower end of reference line CL in the base 2 provides a target reference position A.

In the reference position A thus provided, the bracket 25 for retaining the exterior parts is about to the lower end of the jig 1 to thereby carry out the positioning in the height direction. That is, the upper end of the bracket 25 is allowed to about to the lower end of the jig 1 installed in the vehicle 20. Thus, the positioning in the height direction can be carried out mechanically without visual confirmation, variations in attachment location depending on an worker can be lessened.

After about the upper end of the bracket 25 thereto, the bracket 25 is moved in the horizontal direction to align the center of the bracket 25 with the reference line CL while viewing the reference line CL from the vertical direction. Since the jigs 1F, 1C and 1R are fixed to the vehicle 20 at this time, the worker does not need to pressingly support the Jigs 1F, 1C and 1R, and thus hen can position and attach the bracket 25 using both hands, thus enabling the reduction of the number of man-hours as well as the precise positioning without the need of skills. Alternatively, the extension section may be fixed to the outside body 23 of the door by means of a detachable adherence means in order to ensure the fixing of the jig 1 to the vehicle 20. Moreover, there may be provided two or more first engagement portions 4 so that one of them may be fixed to the vehicle 20. Alternatively, there may be provided the two or more second engagement portions 5 so that one of them may be fixed to the vehicle 20.

Next, a modified example of the foregoing embodiment is explained with reference to FIG. 9. In the meantime, those which are described in the foregoing embodiment are designated by the same reference numerals, and their repeated descriptions omitted.

Figure 9:
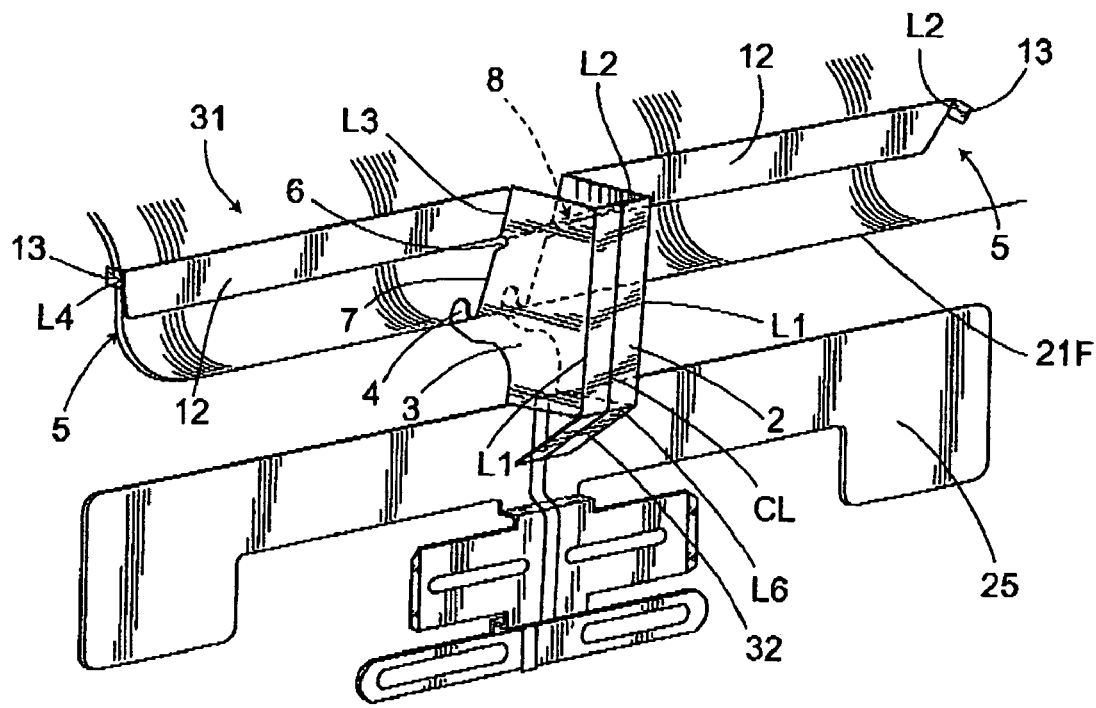
FIG. 9 is a perspective view of a modified example of the first embodiment, which is also in actual use.

A jig 31 shown in FIG. 9 is provided with an extension section 32 in the lower end of the base 2, with the reference line CT being prolonged to the extension section 32. The extension section 32 is connected to the base 2 through the fifth return line L6. The jig 1 constituted in this way is engaged with the door 21 in the first engagement portions 4 and the second engagement portions 5, respectively so that it is installed in the vehicle 20. The extension section 32 is folded convexly in the fifth return line L6. The bracket 25 is about to the lower end of the jig 1, and then it is moved horizontally with such about state being maintained. Since the extension section 32 folded convexly is, prolonged even to the bracket 25 at this time, the reference line CL call be directly about to the bracket 25. Thus, the accurate alignment of the bracket 25 to the reference line CL can be realized without viewing the reference line CF from the vertical direction, thereby enabling easier positioning and improving the accuracy.

According to the present embodiment, the jig 1 used for attaching the vehicular exterior parts to the vehicle 20 comprises the first engagement portion 4 which prescribes the location in the height direction of the vehicle 20 and the second engagement portion 5 which prescribes the location in the direction substantially orthogonal to the height direction of the vehicle 20 (i.e., the traveling direction thereof), whereby it is possible to carry out the positioning in mutually orthogonal two directions simultaneously, thus simplifying the positioning works, reducing the number of man-hours while improving the dimensional accuracy in the attachment position since the measurement with a tape measure or marking with a pen is no longer necessary.

Moreover, at least one of the said first engagement portion 4s and the said second engagement portions 5 are fixed between the vehicle body 22 and the door 21, either one of them is fixed therebetween, and thus the jigs 1F, 1C and 1R can remain fixed to the vehicle 20, thus eliminating the need of skills in attachment works, improving the workability as well as the accuracy in mounting location.

Moreover, since the jig 1 can be formed by folding a tabular member, such as a paper pattern, a plastic board or the like, a manufacturing cost can be reduced. Still moreover, since it can be transported in a tabular form, a transportation cost can also be reduced. Furthermore, since the jig 1 can be formed by cutting a tabular member and folding it up suitably, no special technique is required to form the jigs 1F, 1C and 1R when installing the vehicle parts.

In addition to the foregoing, since the jig 1 comprises the base 2 including the first engagement portion 4 and the second engagement portion 5, said base 2 further including the extension section 32 provided with the reference line CL for indicating the reference mounting location of the vehicular exterior parts, it is possible to improve the accuracy of the mounting location without the need of skills.

SECOND EMBODIMENT

Next, a second embodiment of the jig according to the present invention is explained, where the description of the same portions as those already described are simplified or omitted.

Figure 10:
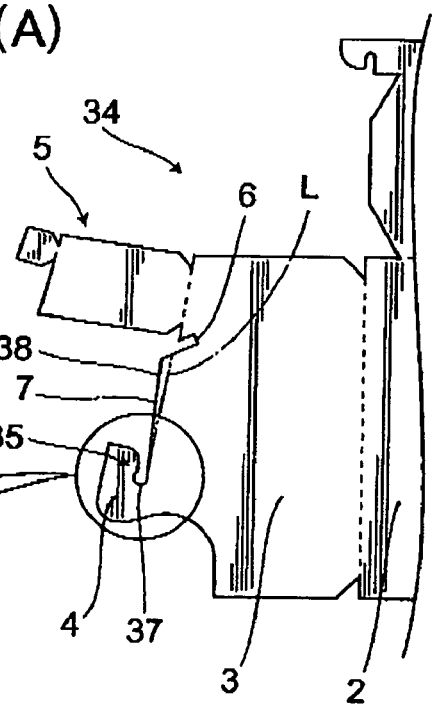
Figure 10:
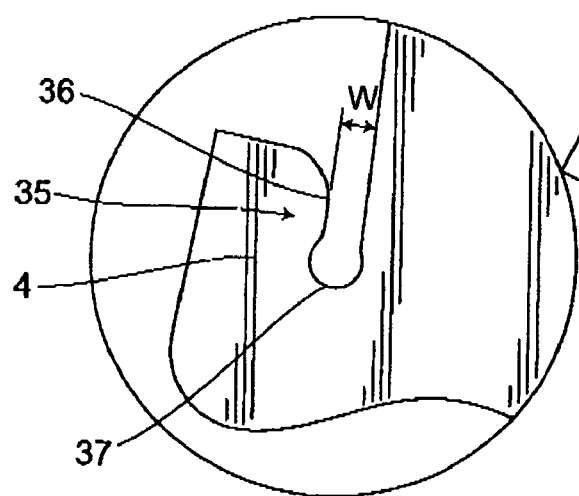

A jig 34 shown in FIG. 10 comprises the base 2, the side face sections 3 arranged in the sides of the base 2, the first engagement portion 4 provided in the side face section 3 and the second engagement portion 5 extending horizontally from the said side face section 3 in a manner like a wing. Although the jig 34 is symmetrically formed with respect to the base 2, the overall view thereof is omitted for the sake of simplicity.

The first engagement portion 4 has an opening of a hook shape, including a hold section 35. The hold section 35 comprises an inlet section 36 formed on a distal side of the first engagement portion 4, and a bottom section 37 provided on a proximal side thereof, communicating with the said inlet section 36. The inlet section 36 is formed into a gently curved shape, communicating with the distal end of the first engagement portion 4, defining an opening width W narrower than that of the bottom section 37. Further, the bottom section 37 is formed into an arc shape, having an approximately equal or larger diameter than the opening width W of said hold section 35.

The side end 7 is formed with an interference margin 38. The interference margin 38 is constituted of a slanted surface which is slanted outside gently upward from the bottom section 37. In the meantime, one-dotted chain line L in FIG. 10 shows the side end 7 in the case that the interference margin 38 is not provide.

Figure 11:
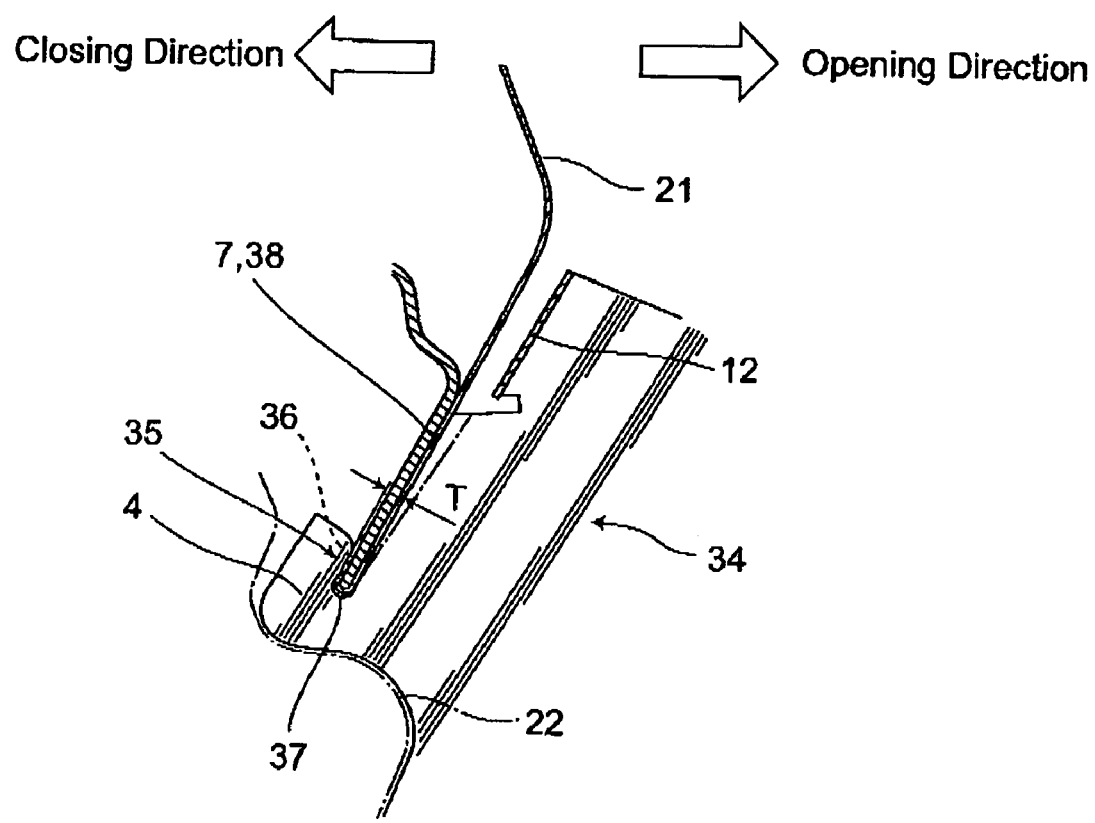
FIG. 11 is a longitudinal section thereof, which is in actual use.

Next, how to install the above-structured jig 34 to the door 21 is explained with reference to FIG. 11. The first engagement portion 4 is inserted from the lower end or the door 21 in an opened state. Due to the inlet section 36 communicating in a gentle R shape with the distal end of the first engagement portion 4, the jig 34 can be easily inserted into the lower end of the door 21. When the first engagement portion 4 is inserted in the lower end of the door 21, the hold section 35 is allowed to come into a sliding contact with the door 21 while the lower end of the door 21 is about to the bottom section 37. The opening width W of the hold section 35 is made slightly smaller than the thickness T of the door 21, and thus the door 21 can be sandwiched pressingly. At this time, stress arises in an open direction in the hold section 35. The stress, however, is dispersed and absorbed in the bottom section 37 due to the bottom section 37 being formed into an arc shape. Accordingly, the hold section 35 can be used repeatedly without being subjected to a fatal damage by such one-time use. Further, since the bottom section 37 is formed into an arc shape having slightly larger diameter than the width of the hold section 35, larger stress can be dispersed and absorbed, thus enabling the durability to be improved further.

Since the hold section 35 holds the door 21 tightly in this way, the jig 34 can be held in place relative to the door 21. Accordingly, it is not necessary for a worker to open and close the door 21 while holding the jig 34, and thus workability can be improved. Moreover, it is possible to reduce the number of man-hours with improved positioning accuracy, since the jig 34 is not moved improperly in opening or closing the door 21. Furthermore, the workability in the case of installing two or more jigs 34 in one door 21 can be improved noticeably.

Moreover, even if the door 21 is moved in the opening direction relative to the vehicle body 22, the provision of the interference margin 38 in said side end 7 enables the lower end of the jig 34 to be about to the vehicle body 22 reliably, thus ensuring the accurate positioning On the other hand, when the door 21 is moved in the closing direction relative to the vehicle body 22, the lower end of the jig 34 is capable of being about to the vehicle body 22 to ensure the accurate positioning, as follows:

Namely, when the door 21 is moved in the closing direction relative to the vehicle body 22, the lower end of the jig 34 is pressed toward the opening direction by the vehicle body 22. When the lower end of the jig 34 is pressed toward the opening direction by the vehicle body 22, then a counterclockwise moment about the hold section 35 will arise in the jig 34. When such counterclockwise moment arises in the jig 34, then the upper end of the side end 7 is pressed to the door 21. The stresses developed in the upper end of the side end 7 and the lower end of the jig 34 are concentrated on the hold section 35 that has comparatively a low strength as compared with the upper end of the side end 7 and the lower end of the jig 34. Accordingly, the stresses developed in the upper end of the side end 7 and the lower end of the jig 34 are absorbed in the hold section 35. At this time, the stresses can be disperse due to the bottom section 37 being provided in the hold section 35, thus enabling the durability of the jig 34 to be improved.

Figure 12:
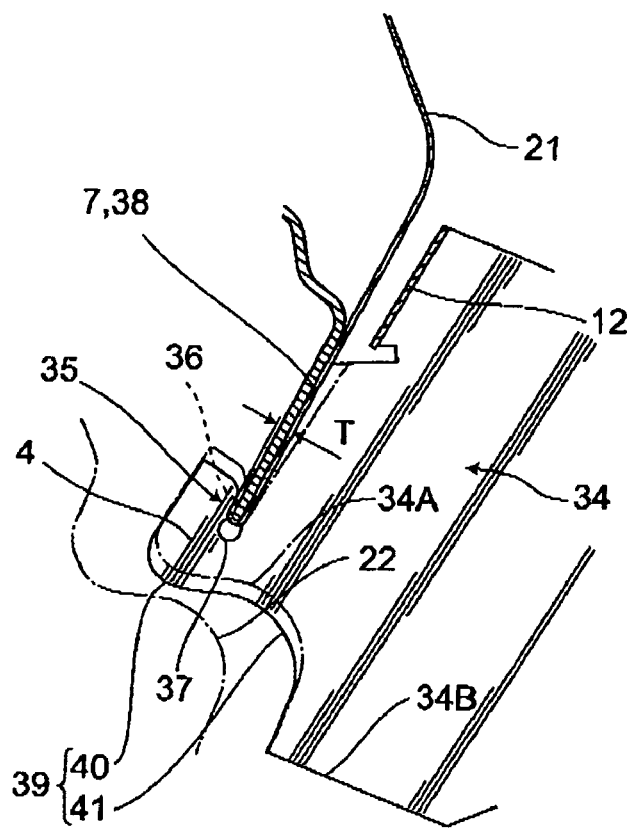
Figure 12:
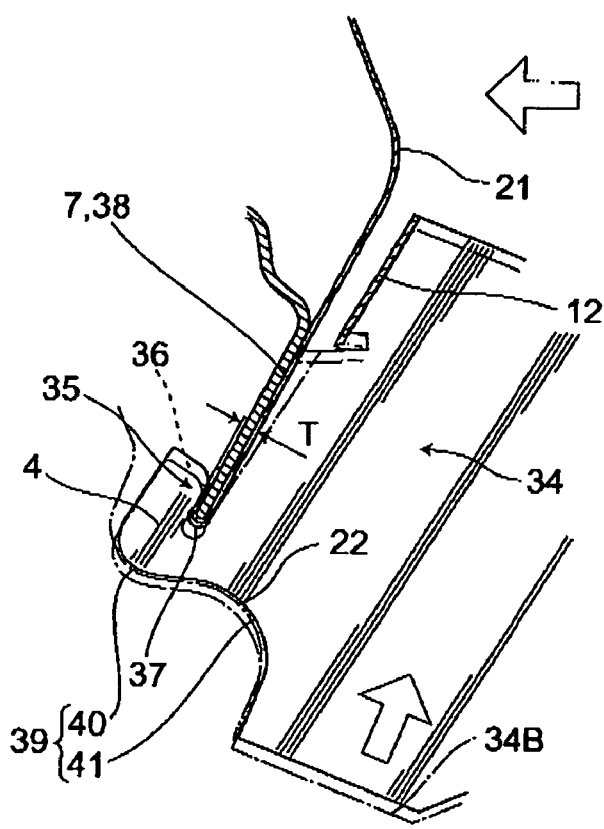

Next, a positioning mechanism 39 of the jig 34 is explained with reference to FIG. 12. The positioning mechanism 39 comprises an inserting section 40 and an about section 41 which are provided in a lower portion of said first engagement portion 4. The inserting section 40 is curved convexly, while the about section 41 is curved concavely, corresponding to the shape of the vehicle body 22.

Next is a description of the action of the positioning mechanism 39 constituted thus way. First, a case where the jig 34 is arranged with the same displaced downward relative to the lower end of the door 21 is explained. In FIGS. 12(A) and 12(B), reference numeral 34A denotes a state in which the jig 34 is in a predetermined location, while 34B a state in which the jig 34 is arranged at a location displaced downwardly. The jig 34 is held by inserting the lower end of the door 21 into the hold section 35 (see FIG. 12(A)). That is, due to the aforesaid opening width W being narrower than the thickness T of the lower end of the door 21, it is possible to temporarily hold the jig 34 in position with the same being located below the predetermined location. Since it is possible to temporarily hold the jig 34 in position in this way, the door 21 can be opened or closed with the jig 34 being held, without fixing the jig 34 using a tape or the like.

When the door 21 is closed in that state, the convexly-curved inserting section 40 formed in the underside of the first engagement portion 4 is about to the vehicle body 22. When the inserting section 40 abouts to the vehicle body 22, the jig 34 is pushed upward by the vehicle body 22, moved upward along the door 21, so that the about section 41 is about to the vehicle body 22, as shown in FIG. 12(B). Thus, even in the case that the jig is displaced downward of the door 21, the jig 34 can be positioned in a predetermined location. Furthermore, due to the inserting section 40 being formed convexly, the jig 34 can be smoothly moved along the vehicle body 22 without damaging the jig 34 even when about to the vehicle body 22, so that the positioning to the predetermined location can be carried out. Moreover, due to the jig 34 having the opening width W formed narrower than the thickness T of the lower end of the door 21, the jig 34 can be held in place relative to the door 21, even if the door 21 is displaced upward of the vehicle body 22, enabling the positioning in a predetermined position.

Figure 13:
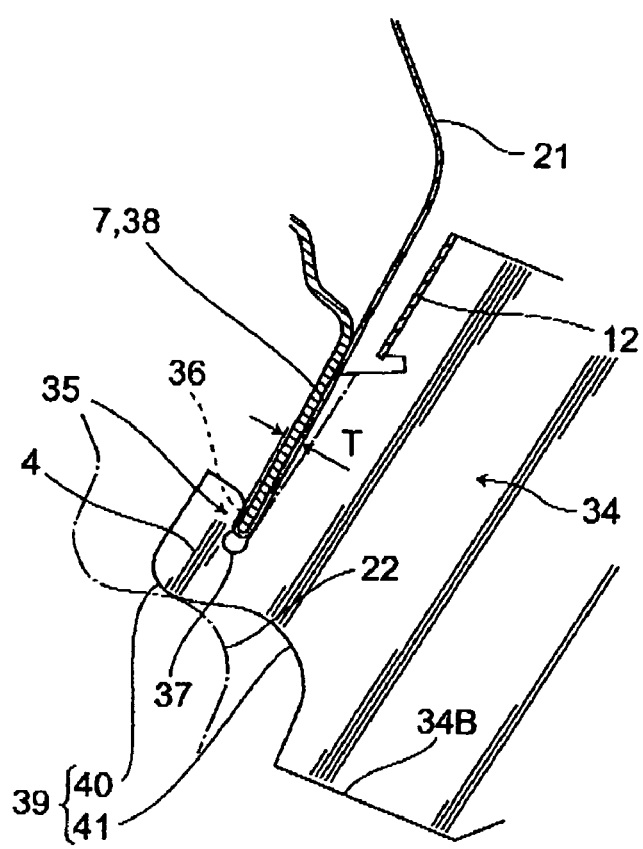
Figure 13:
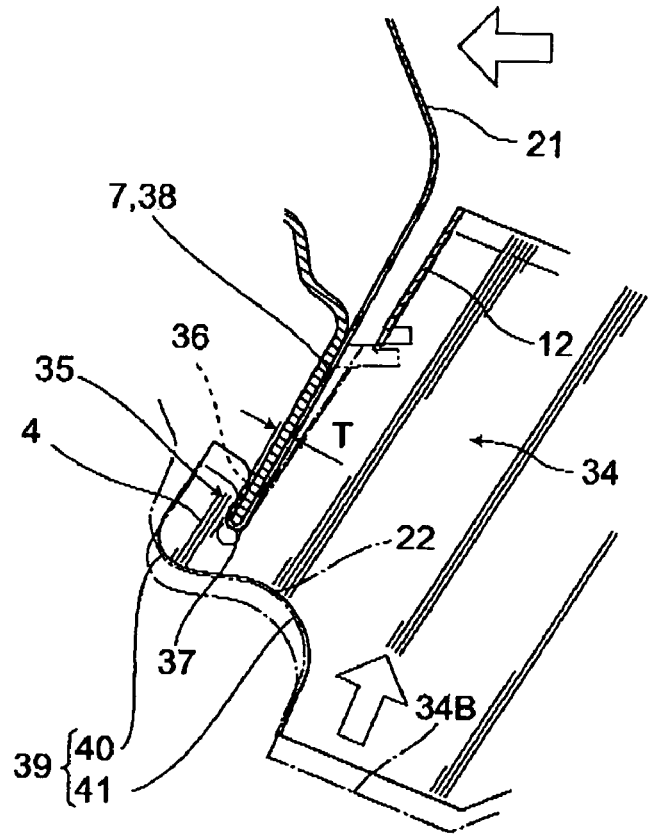
Figure 14:
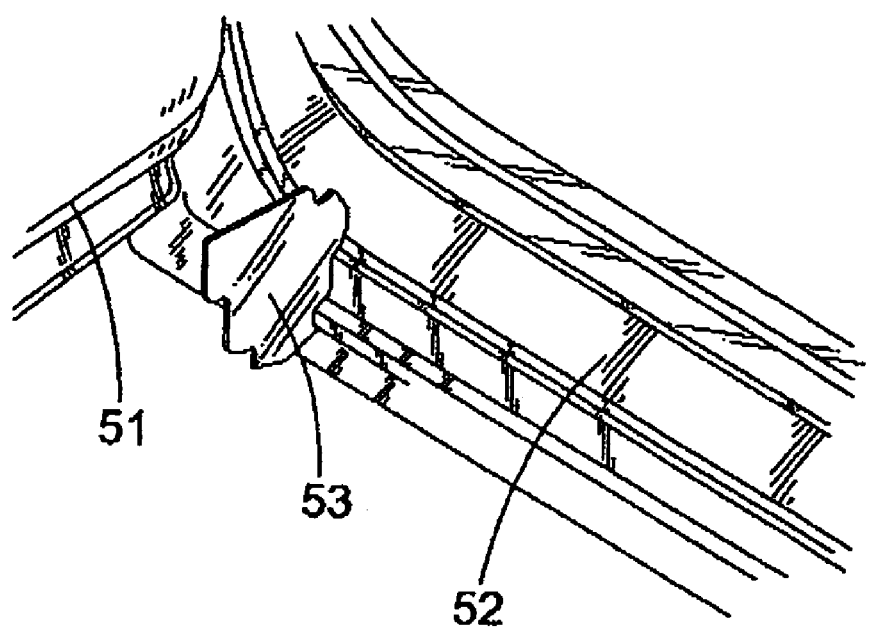
FIG. 14 is a perspective view of a jig according to prior art.

Next, the action of the positioning mechanism 39 when the door 21 is displaced downward relative to the vehicle body 22 is explained with reference to FIGS. 13(A) and 13(B). If the door 21 is closed with the jig 34 being held in the lower end thereof, under the condition that the door 21 is displaced downward of the vehicle body 22, as shown in FIG. 13(A), the inserting section 40 is about to the vehicle body 22 so that the jig 34 is pushed upward by the vehicle body 22. At this time, as the door 21 is displaced downward, the jig 34 allows the bottom section 37 to be moved upward along the door 21 beyond where it is about to the lower end of the door 21, so that the about section 41 is about to the vehicle body 22, as shown in FIG. 13(B). Accordingly, the lower end of the door is allowed to thrust into the bottom section 37 to thereby deform the bottom section 37. At this time, since the jig 34 is formed from a pasteboard or the like, the bottom section 37 can be deformed easily. Thus way, even when the door 21 is displaced downward, such downward displacement of the door 21 can be absorbed owing to the easy deformability of the bottom section 37, so that the jig 34 can be positioned in a predetermined location.

As mentioned above, according to the present embodiment, it is no longer necessary for a worker to open or close the door 21 with the jig 34 being held, due to said first engagement portion 4 including the hold section 35 for holding the door 21, thus enabling the workability to be improved. Further, the number of man-hours cm be reduced while improving the positioning accuracy, since the jig 34 is prevented from being moved unexpectedly in opening or closing the door 21. Particularly, the workability in the case of installing two or more jigs 34 in one door 21 can be improved remarkably.

Also, the inlet section 36 formed narrower than the bottom section 37 ensures the door 21 to be held reliably.

Still also, due to the hold section 35 including the bottom section 37 of an arc shape, having slightly larger diameter than the opening width W of said hold section 35, it is possible to disperse and absorb, in the bottom section 37, the stresses that act on the hold section 35. Accordingly, the hold section 35 can withstand repeated use, thus enabling the durability and workability of the jig 34 to be improved.

Further, due to the interference margin 38 being provided in the side edge 7, the about of the jig 34 to the vehicle body 22 is ensured even if the door 21 is displaced in the closing direction relative to the vehicle body 22, thus ensuring the accurate positioning.

Furthermore, due to the opening width W being narrower than the thickness T of the lower end of the door 21, the jig 34 can be temporarily held in position, so that the door 21 can be opened and closed with the jig 34 being held even if a tape or the like is not used, thus enabling the positioning to be carried out easily.

Moreover, due to the positioning mechanism 39 being provided, some troublesome steps can be saved, such as the steps for temporary fixation of the jig 34 with a tape, visual confirmation for installing the jig 34 in a predetermined location.

Still moreover, due to the positioning mechanism 39 comprising the inserting section 40 and the about section 41 inserting section 40, the jig 34 can be moved smoothly along the vehicle body 22 without damaging the jig 34, thus enabling the positioning in a predetermined location.

In addition to the foregoing, due to the jig being made from a deformable pasteboard or the like, the bottom section 37 is easily deformable to absorb the displacement of the door 21 when the door 21 is displaced below the vehicle body 22, thus enabling the jig 34 to be positioned in a predetermined location.

This invention is not limited to the foregoing embodiments, and various modifications thereof are possible within the scope of the invention. For example, although the jig is made from a tabular member, such as a paper pattern and pasteboard in the foregoing embodiments, the invention is not limited thereto and the jig may be made from rubber or synthetic resin, such as a plastic board. By forming the jig from synthetic resin or the like, it becomes possible to use the jig repeatedly so that it can also be used in the production line of a manufacturing plant.

What is claimed:

1. A jig for positioning vehicular part, used when attaching the vehicular part to a vehicle, comprising:
   a first engagement portion prescribing a location in a height direction of the vehicle by engaging with a lower end of an openable and closable body said vehicle; and
   a second engagement portion prescribing a location in a direction substantially orthogonal to the height direction of said vehicle by engaging with a front end or a back end of said openable and closable body,
   wherein at least one of said first and second engagement portions includes a hold section for holding said openable and closable body in a sandwiched manner to attach the jig to said openable and closable body.

2. The jig for positioning vehicular part according to claim 1, wherein at least one of said first engagement portion and said second engagement portion is fixed between a vehicle body and an openable and closable body.

3. The jig for positioning vehicular part according to claim 1, wherein said jig is formed by folding a tabular member.

4. The jig for positioning vehicular part according to claim 2, wherein said jig is formed by folding a tabular member.

5. The jig for positioning vehicular part according to claim 1, further comprising a base, said base including said fist and second engagement portions, wherein said base further includes an extension section provided with a reference line for indicating a reference mounting location of the vehicular part.

6. The jig for positioning vehicular part according to claim 2, further comprising a base, said base including said first and second engagement portions, wherein said base further includes an extension section provided with a reference line for indicating a reference mounting location of the vehicular exterior parts.

7. The jig for positioning vehicular part according to claim 3, further comprising a base, said base including said first and second engagement portions, wherein said base further includes an extension section provided with a reference line for indicating a reference mounting location of the vehicular exterior parts.

8. The jig for positioning vehicular part according to claim 4, further comprising a base, said base including said first and second engagement portions, wherein said base further includes an extension section provided with a reference line for indicating a reference mounting location of the vehicular exterior parts.

9. The jig for positioning vehicular part according to claim 1, wherein said hold section comprises an inlet section and a bottom section, said inlet section being formed narrower than said bottom section.

10. The jig for positioning vehicular part according to claim 2, wherein said hold section comprises an inlet section and a bottom section, said inlet section being formed narrower than said bottom section.

11. The jig for positioning vehicular part according to claim 3, wherein said hold section comprises an inlet section and a bottom section, said inlet section being formed narrower than said bottom section.

12. The jig for positioning vehicular part according to claim 4, wherein said hold section comprises an inlet section and a bottom section, said inlet section being formed narrower than said bottom section.

13. The jig for positioning vehicular part according to claim 5, wherein said hold section comprises an inlet section and a bottom section, said inlet section being formed narrower than said bottom section.

14. The jig for positioning vehicular part according to claim 6, wherein said hold section comprises an inlet section and a bottom section, said inlet section being formed narrower than said bottom section.

* * * * *